United States Patent
Han

(10) Patent No.: US 9,202,160 B2
(45) Date of Patent: Dec. 1, 2015

(54) MEMORY CARD ADAPTER

(71) Applicant: Samsung Electronics Co., Ltd., Suwon-Si, Gyeonggi-Do (KR)

(72) Inventor: Seok-Jae Han, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 13/953,967

(22) Filed: Jul. 30, 2013

(65) Prior Publication Data

US 2014/0127947 A1    May 8, 2014

(30) Foreign Application Priority Data

Nov. 8, 2012  (KR) .................. 10-2012-0125782

(51) Int. Cl.
*H01R 24/00* (2011.01)
*G06K 19/077* (2006.01)

(52) U.S. Cl.
CPC .......... *G06K 19/07739* (2013.01); *H01R 23/00* (2013.01)

(58) Field of Classification Search
CPC .............................. G06K 7/0021; H01R 27/00
USPC ......................................................... 439/630
See application file for complete search history.

(56) References Cited

U.S. PATENT DOCUMENTS

| | | | |
|---|---|---|---|
| 6,050,832 A * | 4/2000 | Lee et al. .................. | 439/91 |
| 6,768,645 B2 | 7/2004 | Kadonaga | |
| 7,094,106 B2 | 8/2006 | Yamamoto et al. | |
| 7,097,512 B1 | 8/2006 | Hsiao et al. | |
| 7,112,074 B2 | 9/2006 | Nakai et al. | |
| 7,210,967 B1 | 5/2007 | Lee | |
| 7,249,975 B1 | 7/2007 | Liu | |
| 7,255,606 B2 | 8/2007 | Tanaka et al. | |
| 7,294,918 B2 | 11/2007 | Wada et al. | |
| 7,300,296 B1 | 11/2007 | Tanaka et al. | |
| 7,314,388 B2 | 1/2008 | Yamada et al. | |

(Continued)

FOREIGN PATENT DOCUMENTS

| | | |
|---|---|---|
| JP | 2009-020805 | 1/2008 |
| JP | 2009-217487 | 9/2009 |

(Continued)

OTHER PUBLICATIONS

SD Association, SD Input/Output (SDIO) Card Specification, Version 1.00, Oct. 2001, pp. 1-29.*

*Primary Examiner* — Abdullah Riyami
*Assistant Examiner* — Justin Kratt
(74) *Attorney, Agent, or Firm* — Harness, Dickey & Pierce, PLC

(57) ABSTRACT

A memory card adaptor is provided which includes a housing including a bottom lid and a top lid that form the housing. The housing may be configured to receive a memory card. The memory card adaptor may include a package substrate between the bottom lid and the top lid. The package substrate may include a core having a first surface and a second surface; a first layer on the first surface, and the first layer may include a plurality of contact lands; and a second layer on the second surface, and the second layer may include a plurality of contact pads that are electrically connected with the contact lands through a plurality of via holes. The plurality of via holes may be formed such that they penetrate the core. One of the first and second layers may include a return path on at least one signal line.

18 Claims, 10 Drawing Sheets

(56) References Cited

U.S. PATENT DOCUMENTS

| | | |
|---|---|---|
| 7,341,194 B2 | 3/2008 | Lin |
| 7,357,677 B2 | 4/2008 | Liu |
| 7,371,119 B1 | 5/2008 | Lee |
| 7,405,470 B2 | 7/2008 | Iwasaki |
| 7,410,376 B2 | 8/2008 | Ying et al. |
| 7,411,284 B2 | 8/2008 | Iwasaki |
| 7,425,157 B1 * | 9/2008 | Hung .................. 439/630 |
| 7,427,026 B2 | 9/2008 | Kojima et al. |
| 7,427,032 B2 | 9/2008 | Osako et al. |
| 7,489,027 B2 | 2/2009 | Iwasaki |
| 7,659,607 B2 | 2/2010 | Iwasaki |
| 7,768,111 B2 | 8/2010 | Iwasaki |
| 7,847,712 B2 | 12/2010 | Chen et al. |
| 8,102,658 B2 * | 1/2012 | Hiew et al. .................. 361/737 |
| 2007/0207676 A1 * | 9/2007 | Ying et al. .................. 439/630 |
| 2007/0274033 A1 | 11/2007 | Hwang |
| 2010/0105251 A1 * | 4/2010 | Hiew et al. .................. 439/638 |

FOREIGN PATENT DOCUMENTS

| | | |
|---|---|---|
| KR | 10-0799439 | 1/2008 |
| KR | 10-0818015 | 1/2008 |
| KR | 10-1002739 | 12/2010 |
| KR | 20110124808 A | 11/2011 |

* cited by examiner

MEMORY CARD ADAPTER

CROSS-REFERENCE TO RELATED APPLICATIONS

A claim for priority under 35 U.S.C. §119 is made to Korean Patent Application No. 10-2012-0125782 filed Nov. 8, 2012, in the Korean Intellectual Property Office, the entire contents of which are hereby incorporated by reference.

BACKGROUND

Inventive concepts described herein relate to a memory card adaptor.

Portable computing devices (e.g., a cellular phone, a digital camera, etc.) may include various types of memory devices (e.g., a nonvolatile memory device), which are used as auxiliary storage devices. The various types of memory devices may be fabricated together with the portable computing devices. The memory devices may include a compact flash, a multimedia card (MMC), a smart media card (SMC), a secure digital (SD) card, and on the like.

Memory cards may comply with various standards. Additionally, memory cards are may have different shapes and sizes according to a type of each memory card. For this reason, adaptors may be required to receive memory cards having various shapes and sizes.

SUMMARY

According to example embodiments of the inventive concepts, a memory card adaptor is provided. The memory card adaptor may include a housing including a bottom lid and a top lid, the top lid together with the bottom lid may form the housing. The housing may be configured to receive a memory card. The memory card adaptor may include a package substrate between the bottom lid and the top lid. The package substrate may be fixed to the bottom lid. The package substrate may include a core having a first surface and a second surface; a first layer on the first surface, and the first layer may include a plurality of contact lands; and a second layer on the second surface, and the second layer may include a plurality of contact pads that are electrically connected with the contact lands through a plurality of via holes. The plurality of via holes may be formed such that they penetrate the core. Either one of the first and second layers may include a return path on at least one signal line.

Example embodiments provide that contact pins may be formed at a groove of the package substrate, and the contact pins may electrically connect the memory card and the plurality of contact lands.

Example embodiments provide that contact pins may project from the package substrate, and the contact pins may electrically connect the memory card and the plurality of contact lands.

Example embodiments provide that the plurality of contact pads may be electrically connected with the plurality of via holes without wirings.

Example embodiments provide that the first layer may include a first set of wirings between the plurality of contact lands and the plurality of via holes, where each wire of the first set of wirings corresponds to one of the plurality of contact lands. The second layer may include a second set of wirings between the plurality of via holes and the plurality of contact pads, where each wire of the second set of wirings corresponding to one of the plurality of contact pads.

Example embodiments provide that at least one of the first set of wirings or at least one of the second set of wirings may be formed in a straight line.

Example embodiments provide that the second layer may include a corresponding conduction area having a planar shape. The conduction area may operate as the return path.

Example embodiments provide that the conduction area may be connected with a power pad, where the power pad is one of the plurality of contact pads.

Example embodiments provide that the conduction area may be connected with a ground pad, where the ground pad is one of the plurality of contact pads.

Example embodiments provide that the first layer may include a corresponding conduction area having a planar shape, where the conduction area that corresponds to the first layer operates as the return path. The conduction area corresponding to the second layer and the conduction area corresponding to the first layer may be electrically connected through the plurality of via holes.

Example embodiments provide that at least two of the plurality of via holes may be electrically connected to at least one signal pad, where the signal pad is one of the plurality of contact pads. The at least two via holes may be electrically connected to the signal pad.

Example embodiments provide that the memory card adaptor may further include a first set of wirings on the first surface that may be connected with one of the plurality of contact lands, and a second set of wirings on the second surface that may be connected with the power pad. The plurality of via holes may connect the first set of wirings and the second set of wirings.

Example embodiments provide that the memory card adaptor may further include at least one passive element on the second layer that may be connected with the at least one signal line.

Example embodiments provide that the package substrate may be a printed circuit board.

According to another example embodiment of the inventive concepts a memory card adaptor is provided that may include a plurality of pin-to-pin structured pins, an insulation plate on the plurality of pin-to-pin structured pins, and a conduction plate on the insulation plate. The conduction plate may operate as a return path for at least one signal line.

Example embodiments provide that the memory card adaptor may further include a housing configured to receive a memory card.

Example embodiments provide that the conduction plate and the insulation plate may have a similar shape as the housing.

Example embodiments provide that the plurality of pin-to-pin structured pins may include a power pin, and the conduction plate may be connected to the power pin.

Example embodiments provide that the conduction plate may be connected to one of (i) the ground pin and (ii) an other pin of the plurality of pin-to-pin structured pins corresponding to the ground pin.

According to another example embodiment, a memory card adaptor is provided. The memory card adaptor may include a plurality of pin-to-pin structured pins including a ground pin; a first insulation plate on the plurality of pin-to-pin structured pins; a first conduction plate on the first insulation plate that may be connected with the ground pin, and the first conduction plate may operate as a return path for at least one signal line; a second insulation plate under the plurality of pin-to-pin structured pins; and a second conduction plate under the second insulation plate that may be connected with the ground pin, the second conduction plate may operate as a return path for at least one other signal line.

With embodiment of the inventive concepts, a high frequency characteristic of a memory card adaptor may be improved through a return path on a signal line.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
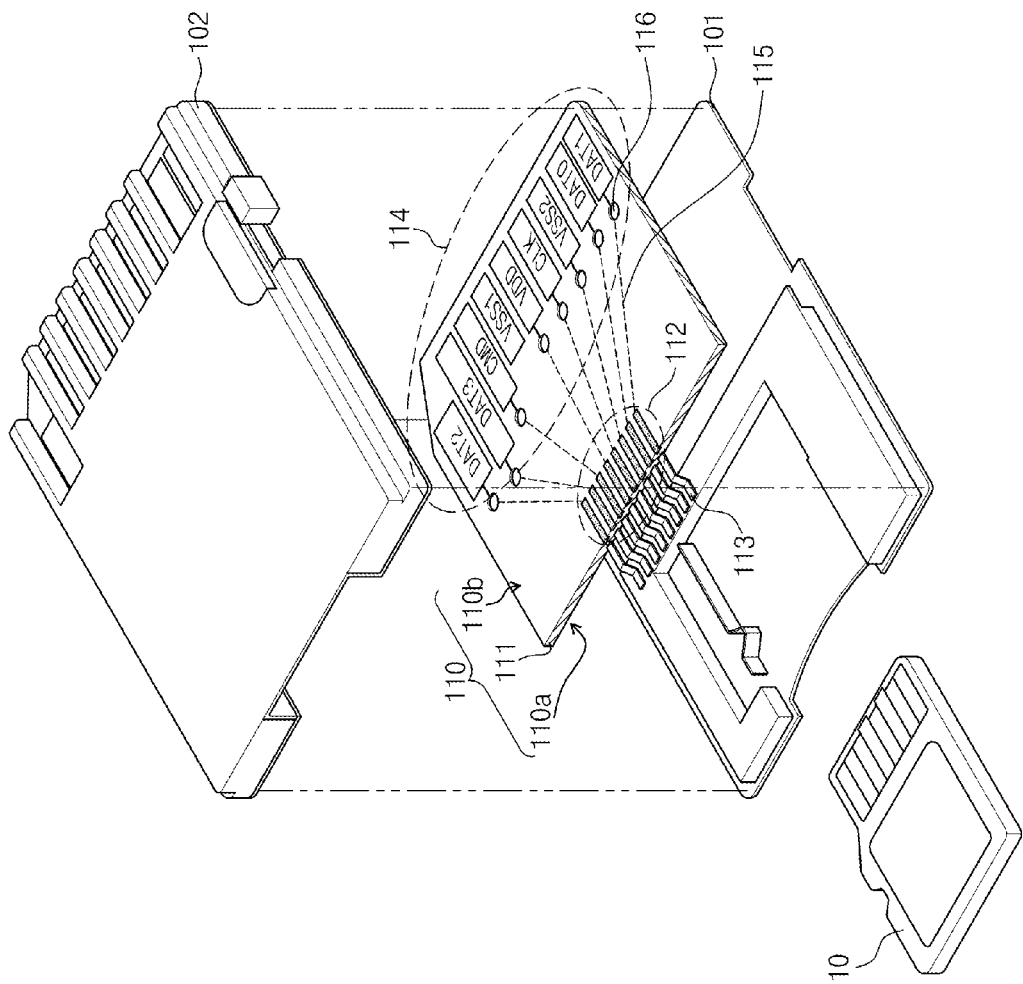
FIG. 1 is a diagram schematically illustrating a memory card adaptor according to an embodiment of the inventive concepts.

Example embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the concept of the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which the inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

A memory card adaptor according to an example embodiment of the inventive concepts may be suitable for a high frequency characteristic by having a return path on a signal line. Herein, the return path may be a path which has low impedance, through which a current induced by a high frequency signal flows, so as to reduce or eliminate an effect on a signal line. In general, a current induced by a high frequency signal may have such a characteristic that it flows into low impedance.

FIG. 1 is a diagram schematically illustrating a memory card adaptor according to an example embodiment of the inventive concepts. Referring to FIG. 1, a memory card adaptor 100 may include a bottom lid 101 and a top lid 102. The bottom lid 101 may fix a package substrate 110, and a memory card 10 may be physically inserted in the bottom lid 101. The top lid 102 may surround the package substrate 110 and form housing together with the bottom lid 101.

According to example embodiments, the memory card 10 may be a micro-SD card. However, the inventive concepts are not limited thereto. The memory card of the inventive concepts may be any memory card. Below, it is assumed that the memory card 10 is a micro-SD card.

The package substrate 110 may connect the memory card 10 with an external card socket. The package substrate 110 may include a core 111 having a first surface and a second surface, a first layer 110a formed on the first surface, a second layer 110b formed on the second surface, and contact pins 113.

The core 111 may include an insulation material. For example, the core 111 may be formed of glass epoxy or other like insulation material.

The first layer 110a may include contact lands 112 connected with the contact pins 113. It should be noted that the terms "lands", "contact lands", and like may refer to any type of electrical connection such as a lead, wire, pin, and/or any other like device that can enable an electrical connection. The contact lands 112 may be electrically connected with contact pads 114 through wirings 115 and via holes 116. It should be noted that the terms "via holes" and like as used herein may also be referred to as "through holes" and the like. The wirings 115 may be divided into first wirings formed on the first layer 110a and second wirings formed on the second layer 110b. Herein, the first wirings may connect the contact lands 112 and corresponding via holes 116, and the second wirings may connect the contact pads 114 and corresponding via holes 116.

As illustrated in FIG. 1, each of the wirings 115 may be formed to have a straight line shape (e.g., a shortest distance) between the lands 112 or contact pads 114 and the via holes 115. However, the inventive concepts are not limited thereto. For example, the shapes and lengths of the wirings 115 may be modified to adjust for data skew.

According to example embodiments, the first layer 110a may have a return path on at least one signal line (e.g., DAT0, DAT1, DAT2, DAT3, CMD, or CLK). The return path may be a planar shape of a conduction area which is connected with a contact land corresponding to a power pad VDD or a ground pad VSS1/VSS2.

The second layer 110b may include the contact pads 114 that may be configured to contact a card socket. According to example embodiments, a size of each of the contact pads 114 may be larger than that of each of corresponding contact lands 112. According to example embodiments, the second layer 110b may have a return path (not shown) on at least one signal line (e.g., DAT0, DAT1, DAT2, DAT3, CMD, or CLK). The return path may be a planar shape of a conduction area which is connected with a contact land corresponding to a power pad VDD or a ground pad VSS1/VSS2.

According to example embodiments, a package substrate 110 may be formed of a printed circuit board (PCB) or other like apparatuses that may mechanically support and electronically connect electronic components.

According to example embodiments, the memory card adaptor 100 may use an UHS (ultra-high speed)-dedicated adaptor, secure data (SD) card adaptor, or other like memory card adaptor capable of converting attributes of a memory card device such that the attributes of the memory card device may be used on an otherwise incompatible device.

In FIG. 1, routing of signal lines (e.g., DAT0 to DAT3, CMD, and CLK) of the package substrate 110 may be made using the layers 110a and 110b. However, the number of layers of the package substrate 110 need not be limited to 2 and may include multiple layers. For example, the package substrate 110 may include at least three or more layers for routing.

Since a return path of a signal line may be another signal line adjacent thereto, a general pin-to-pin structure of a memory card adaptor may not be suitable for a high-speed memory card. Also, in the general memory card adaptor, it may be difficult to adjust for data skew due to limitations on physical locations of data pins DAT0 to DAT3.

On the other hand, the memory card adaptor 100 according to an embodiment of the inventive concepts may include the package substrate 110 having a separate return path which allows a return path of a signal line not to be an adjacent signal line. Thus, the memory card adaptor 100 may be suitable for a high-speed card operation. Further, the memory card adaptor 100 according to an example embodiment of the inventive concepts may include a plurality of layers 110a and 110b to route signal lines freely. Thus, it is possible to adjust for data skew of a signal line.

Figure 2:
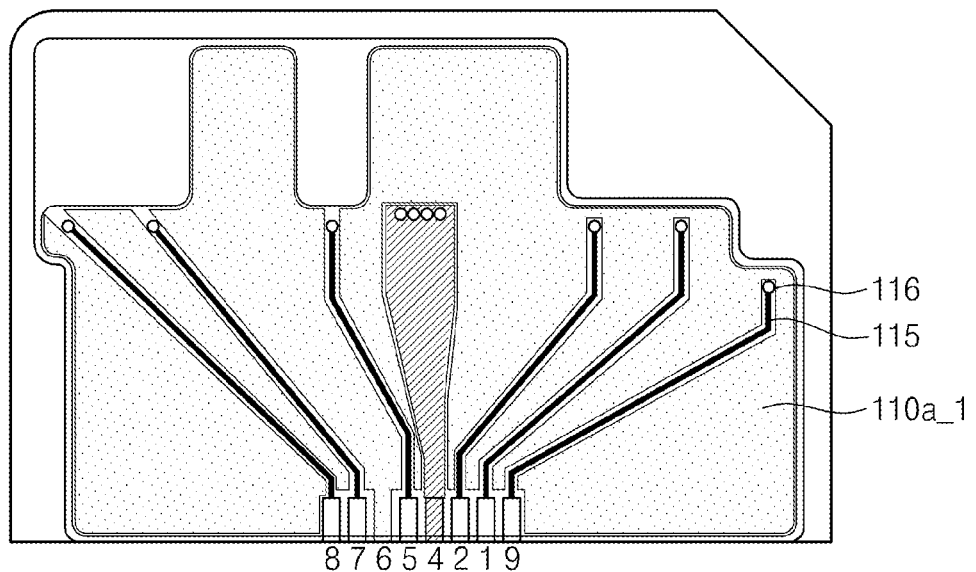
FIG. 2 is a diagram schematically illustrating a first layer of a package substrate 110 of FIG. 1.

FIG. 2 is a diagram schematically illustrating a first layer 110a of a package substrate 110 of FIG. 1, according to an example embodiment. Referring to FIG. 2, a first layer 110a may include a planar shape of conduction area 110a_1 used as a return path. The conduction area 110a_1 may be electrically connected with a contact land 6 corresponding to a first ground pad VSS1 or a second ground pad VSS2. As illustrated in FIG. 2, the conduction area 110a_1 may not be formed at areas symmetrical to signal pads DAT0 to DAT3, CMD, and CLK of a second layer 110b.

Contact lands 8, 7, 5, 2, 1, and 9 corresponding to data pads DAT0 to DAT3, a command pad CMD, and a clock pad CLK may be electrically connected with via holes through wirings. A contact land 4 corresponding to a power pad VDD may be electrically connected with a plurality of via holes through a wiring.

Figure 3:
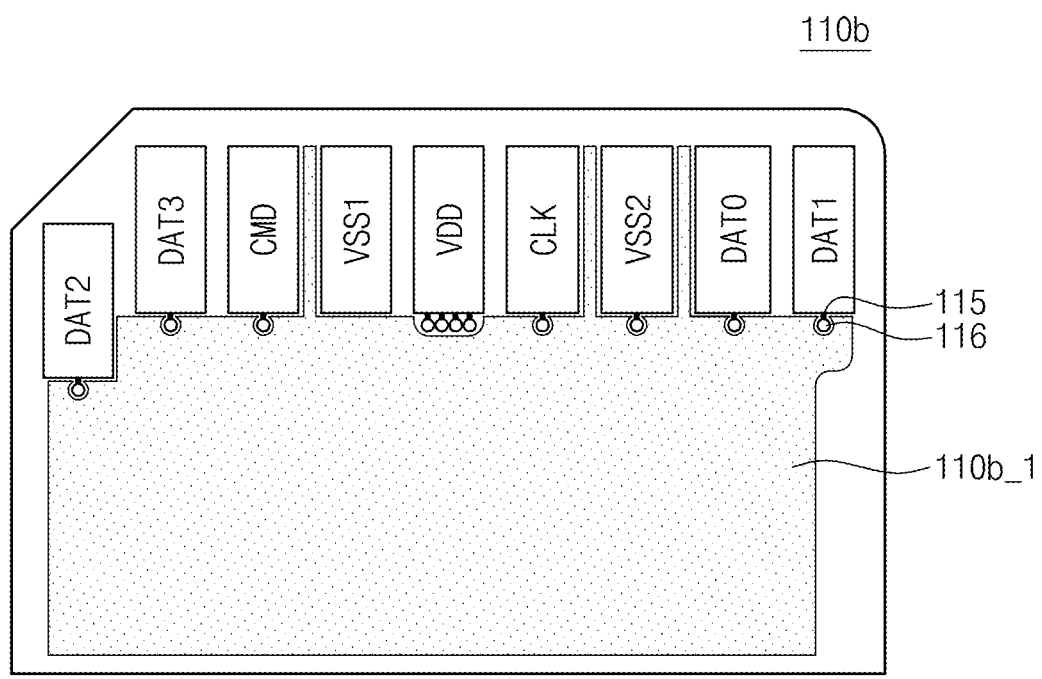
FIG. 3 is a diagram schematically illustrating a second layer of a package substrate 110 of FIG. 1.

FIG. 3 is a diagram schematically illustrating a second layer 110b of a package substrate 110 of FIG. 1, according to an example embodiment. Referring to FIG. 3, a second layer 110b may include a conduction area 110b_1 used as a return path. The conduction area 110b_1 may be electrically connected with a first ground pad VSS1 and a second ground pad VSS2.

Data pads DAT0 to DAT3, a command pad CMD, and a clock pad CLK may be connected with via holes through wirings or without wirings. A power pad VDD may be connected with via holes through wirings or without wirings.

In example embodiments, the conduction area 110b_1 of the second layer 110b may be electrically connected with a conduction area 110a_1 of a first layer 110a through a plurality of via holes (not shown).

In FIG. 3, the conduction area 110b_1 used as a return path may be connected with ground pads VSS1 and VSS2. However, the inventive concepts are not limited thereto. For example, the conduction area 110b_1 used as a return path may be connected with the power pad VDD.

A package substrate according to an embodiment of the inventive concepts may further comprise a passive device for synchronization between data and a clock.

Figure 4:
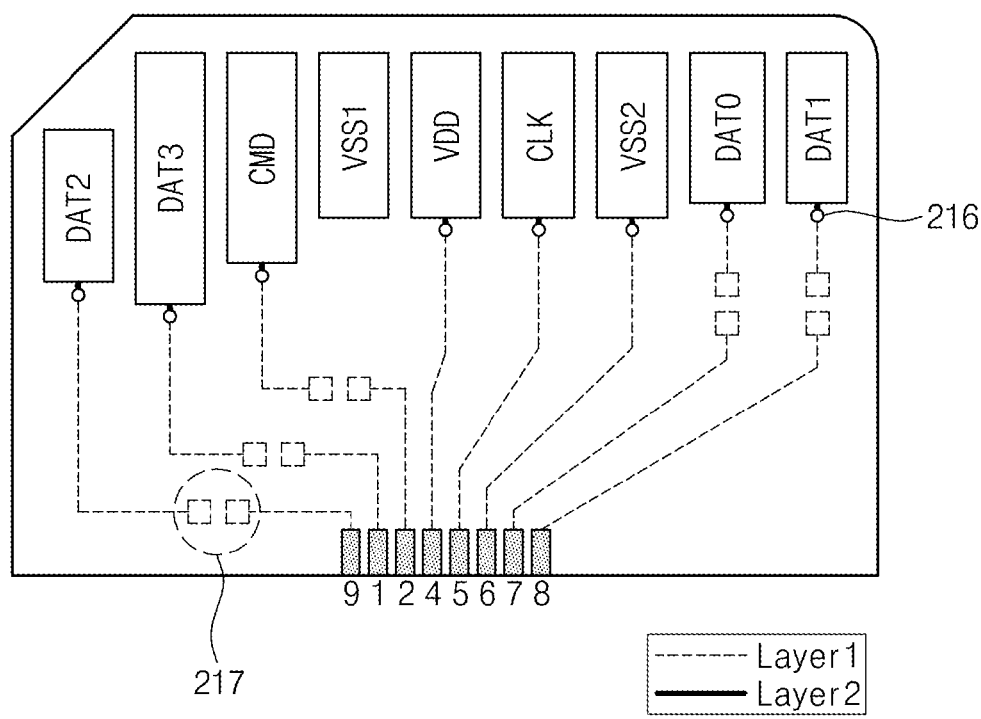
FIG. 4 is a diagram schematically illustrating a package substrate according to another embodiment of the inventive concepts.

FIG. 4 is a diagram schematically illustrating a package substrate according to an example embodiment of the inventive concepts. Referring to FIG. 4, compared with a package substrate 110 of FIG. 1, a package substrate 210 may further comprise passive elements 217 prepared at signal lines connected with data pads DAT0 to DAT3 and a command pad CMD. The passive elements 217 may compensate for resistance and/or inductance and/or capacitance for synchronization between a clock input to a clock pad CLK and a signal input to each of the data pads DAT0 to DAT3 and the command pad CMD. According to example embodiments, the passive elements 217 may be disposed on a first surface (e.g., a first layer 110a of FIG. 2) of the package substrate 210.

The package substrate 210 according to the inventive concepts may adjust resistance and/or inductance and/or capacitance in an optimal condition by connecting at least one passive element 217 with at least one signal line.

The package substrate 210 according to the inventive concepts may be capable of routing between a first layer and a second layer to adjust a signal length for setting of data skew.

Figure 5:
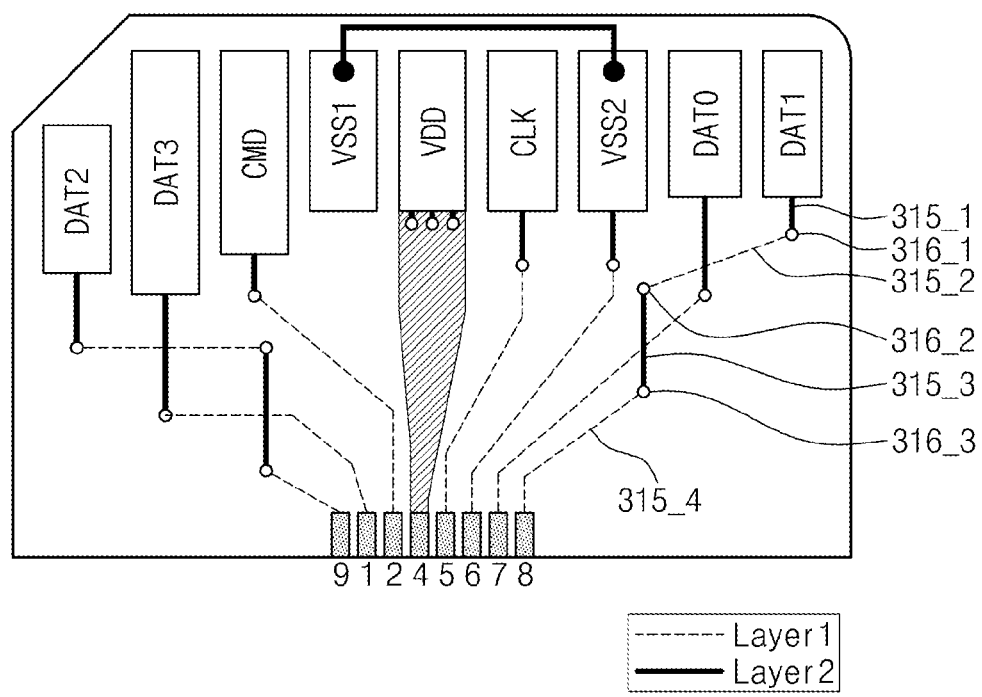
FIG. 5 is a diagram schematically illustrating a package substrate according to still another embodiment of the inventive concepts.

FIG. 5 is a diagram schematically illustrating a package substrate according to an example embodiment of the inventive concepts. Referring to FIG. 5, a package substrate 310 may adjust a signal length of each of data pads DAT0 to DAT3 through physical routing using via holes to set data skew.

Below, a signal line corresponding to a data pad DAT1 will be described. Three via holes 316_1, 316_2, and 316_3 and four wirings 315_1, 315_2, 315_3, and 315_4 may be used to connect a data pad DAT1 of a second layer (e.g., second layer 110b of FIG. 3) and a contact land 8 of a first layer (e.g., first layer 110a of FIG. 2) electrically. The first wiring 315_1 may be formed at the second layer 110b to connect the data pad DAT1 and a first via hole 316_1, and the second wiring 315_2 may be formed at the first layer 110a to connect the first via hole 316_1 and the second via hole 316_2. The third wiring 315_3 may be formed at the second layer 110b to connect the second via hole 316_2 and the third via hole 316_3, and the fourth wiring 315_4 may be formed at the first layer 110a to connect the third via hole 316_3 and a contact Land 8.

The package substrate 310 according to example embodiments of the inventive concepts may adjust a signal length by connecting a signal pad DAT0/DAT1/DAT2/DAT3/CMD/CLK with a corresponding contact land using at least two via holes.

The package substrate 310 according to example embodiments of the inventive concepts may have a plurality of signal lines for connecting a signal pad and a contact pad, and may connect a signal pad and a contact land through one of the plurality of signal lines.

Figure 6:
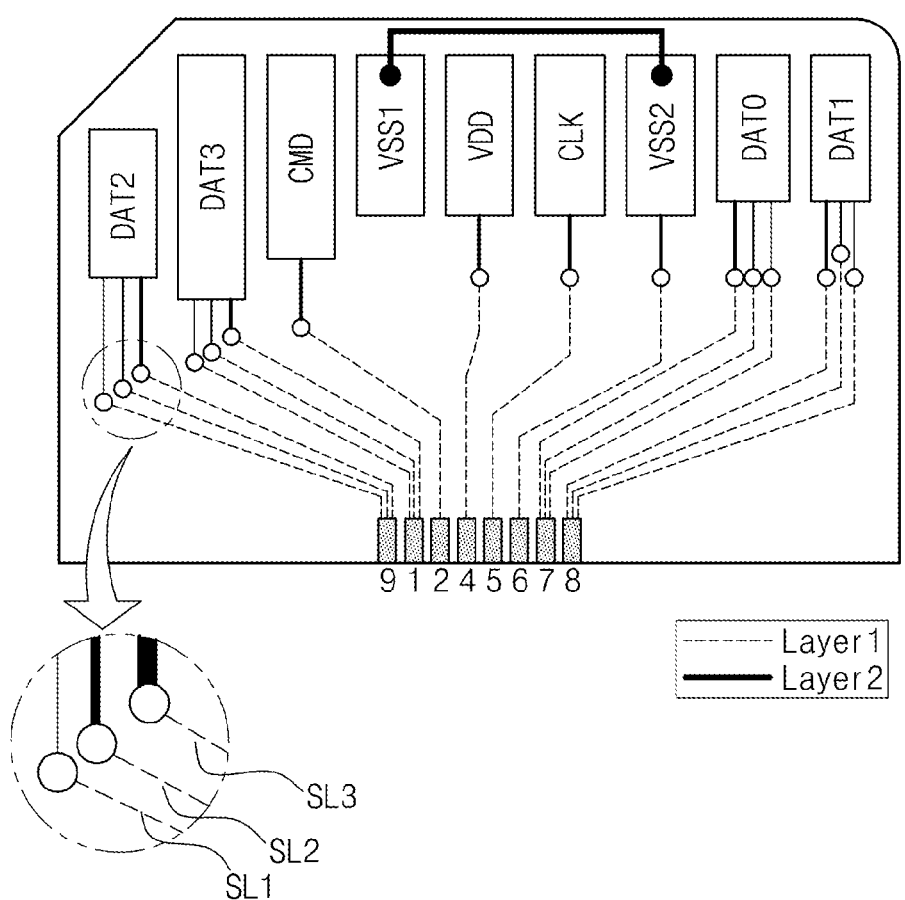
FIG. 6 is a diagram schematically illustrating a package substrate according to still another embodiment of the inventive concepts.

FIG. 6 is a diagram schematically illustrating a package substrate according to an example embodiment of the inventive concepts. Referring to FIG. 6, a package substrate 410 may include a plurality of signal lines SL1, SL2, and SL3 to connect data pads DAT0 to DAT3 with corresponding contact pads. Herein, the signal lines SL1, SL2, and SL3 may be formed on the package substrate 410 to have different signal characteristics according to a high frequency signal. FIG. 6, illustrates an example embodiment in which three signal lines SL1, SL2, and SL3 are formed. However, the inventive concepts are not limited thereto, and more signal lines (or fewer signal lines) may be present than are shown in FIG. 6.

A maker of a memory card adaptor 100 (refer to FIG. 1) may select one from among the signal lines SL1, SL2, and SL3 that has a suitable characteristic of a product in which the memory card adaptor 100 is received, and may connect a data pad and a contact pad using the selected signal line.

The package substrate 410 of the inventive concepts may selectively connect a signal line suitable for a product.

Contact pins 113 of FIG. 1 may be shaped to be projected from a package substrate 110. However, the inventive concepts are not limited thereto. Contact pins of the inventive concepts may be implemented at a groove formed at a core of a package substrate.

Figure 7:
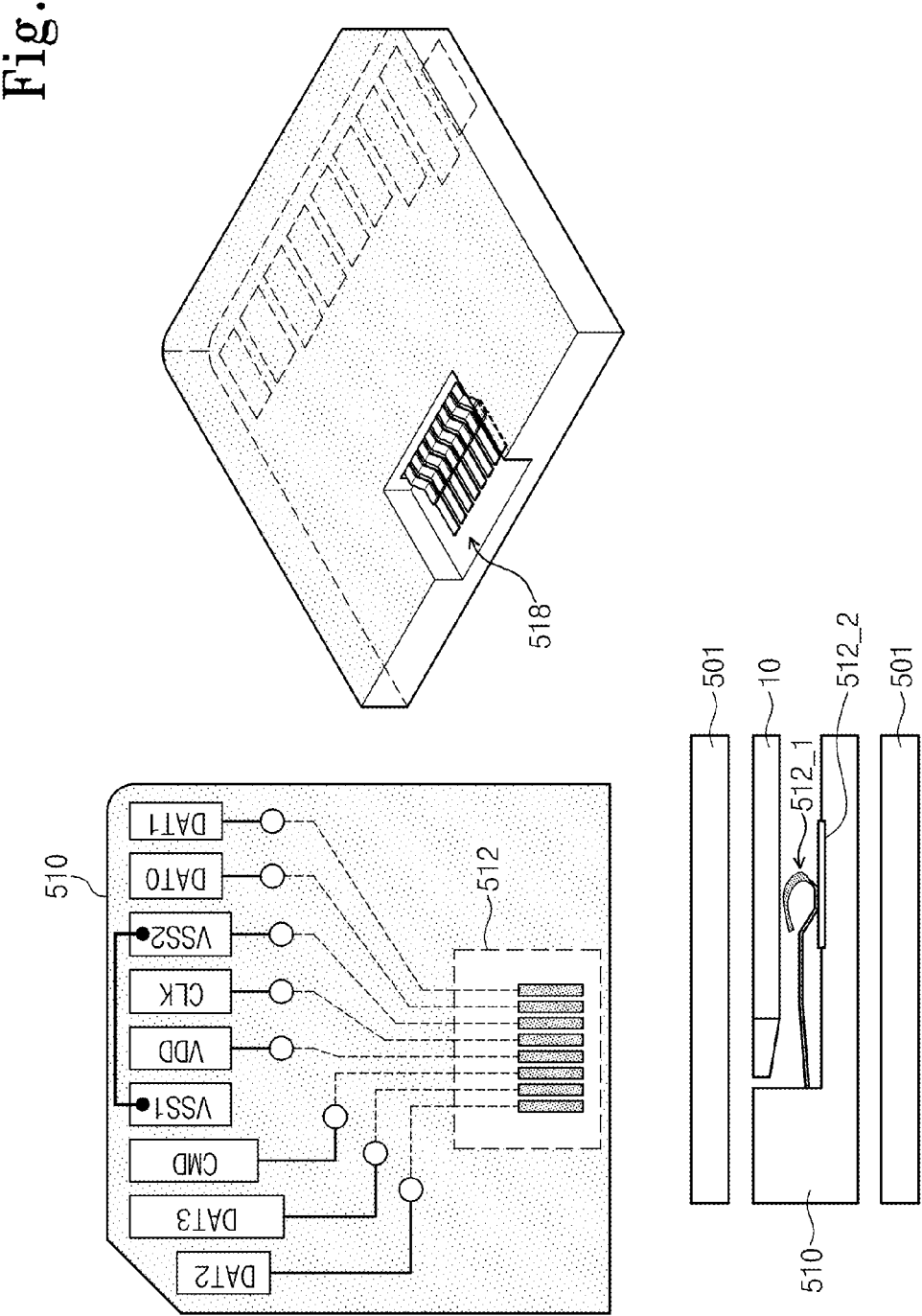
FIG. 7 is a diagram schematically illustrating a package substrate according to still another embodiment of the inventive concepts.

FIG. 7 is a diagram schematically illustrating a package substrate according to an example embodiment of the inventive concepts. Referring to FIG. 7, a package substrate 510 may have a groove 518 formed at a PCB module. Contact pins 512 may be provided in the groove 518. Each of the contact pins 512 may include a contact pin 512_1 and a fixing pad 512_2. As illustrated in FIG. 7, the package substrate 510 (i.e., the PCB module) may be surrounded by a bottom lid 501 and a top lid 502. A macro card 10 and the contact pins 512 formed at the groove 518 of the PCB module may be electrically connected by inserting the macro card 10 in the groove 518 of the PCB module.

Although not shown, a line connected with at least one of contact pads of the package substrate 510 may be routed via at least one via hole or connected with at least one passive element to synchronize a clock and data, to set data skew, and/or the like.

The inventive concepts are applicable to a memory card adaptor having a pin-to-pin structure.

Figure 8:
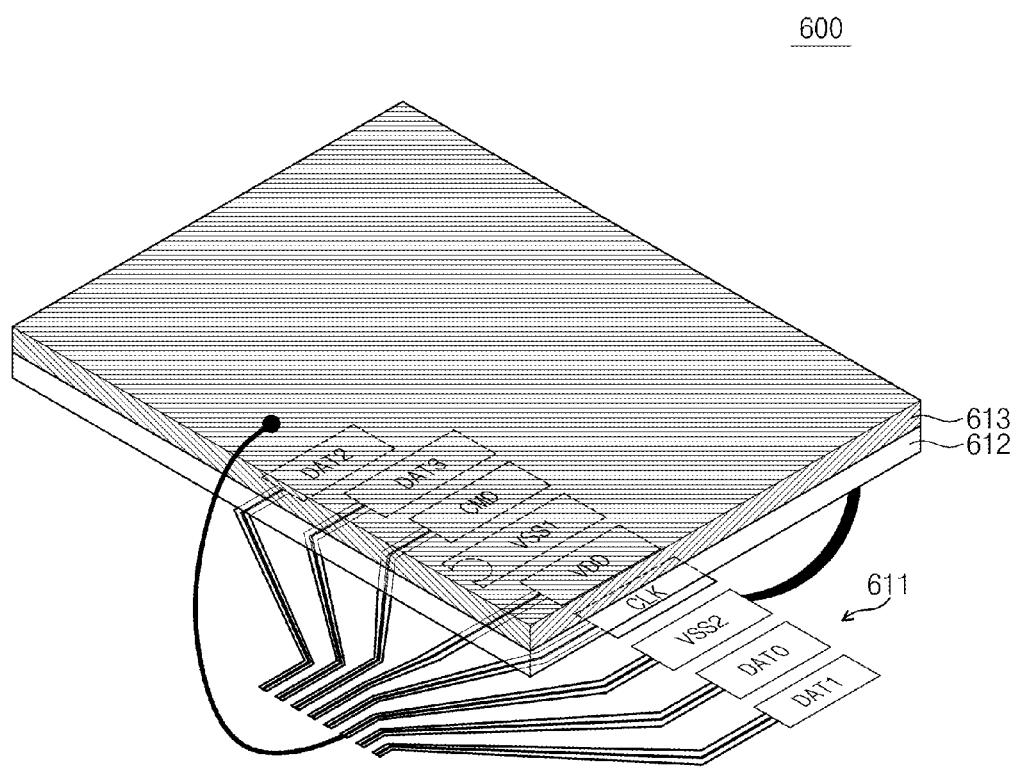
FIG. 8 is a diagram schematically illustrating a memory card adaptor having a pin-to-pin structure according to an embodiment of the inventive concepts.

FIG. 8 is a diagram schematically illustrating a memory card adaptor having a pin-to-pin structure according to an example embodiment of the inventive concepts. Referring to FIG. 8, a memory card adaptor 600 may include pin-to-pin structured pins 611, an insulation plate 612, and a conduction plate 613. The insulation plate 612 may be placed on the pins 611, and the conduction plate 613 may be placed on the insulation plate 612. The conduction plate 613 may be connected with a ground pin VSS2 of the pins 611. The conduction plate 613 may be used as a return path of a signal line.

According to example embodiments, the conduction plate 613 may be connected with a pin corresponding to a ground pin VSS2 in the pin-to-pin structure.

According to other example embodiments, the conduction plate 613 may be connected with a power pin VDD.

According to example embodiments, each of the insulation plate 612 and the conduction plate 613 may be formed to have a film shape, a flat shape, and/or other like substantially two dimensional shape.

In FIG. 8, there is illustrated an example in which the insulation plate 612 and the conduction plate 613 are disposed on the pins 611. However, the inventive concepts is not limited thereto. For example, the insulation plate 612 and the conduction plate 613 can be disposed under the pins 611.

Figure 9:
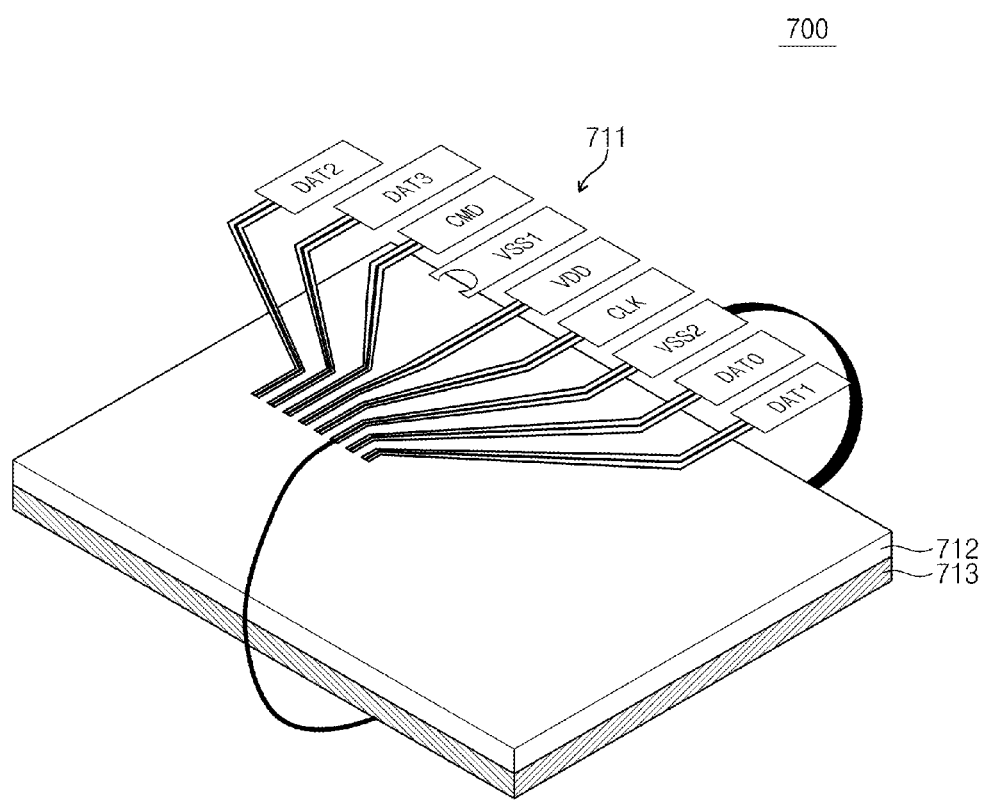
FIG. 9 is a diagram schematically illustrating a memory card adaptor having a pin-to-pin structure according to another embodiment of the inventive concepts.

FIG. 9 is a diagram schematically illustrating a memory card adaptor having a pin-to-pin structure according to an example embodiment of the inventive concepts. Referring to FIG. 9, a memory card adaptor 700 may include pin-to-pin structured pins 711, an insulation plate 712 disposed under the pins 711, and a conduction plate 713 disposed under the insulation plate 712. According to example embodiments, the conduction plate 713 may be connected with a ground pin VSS2. According to other example embodiments, the conduction plate 713 may be connected with a pin corresponding to a ground pin VSS2 in the pin-to-pin structure. Also, the insulation plate 712 and the conduction plate 713 may be disposed on and under the pins 711.

Figure 10:
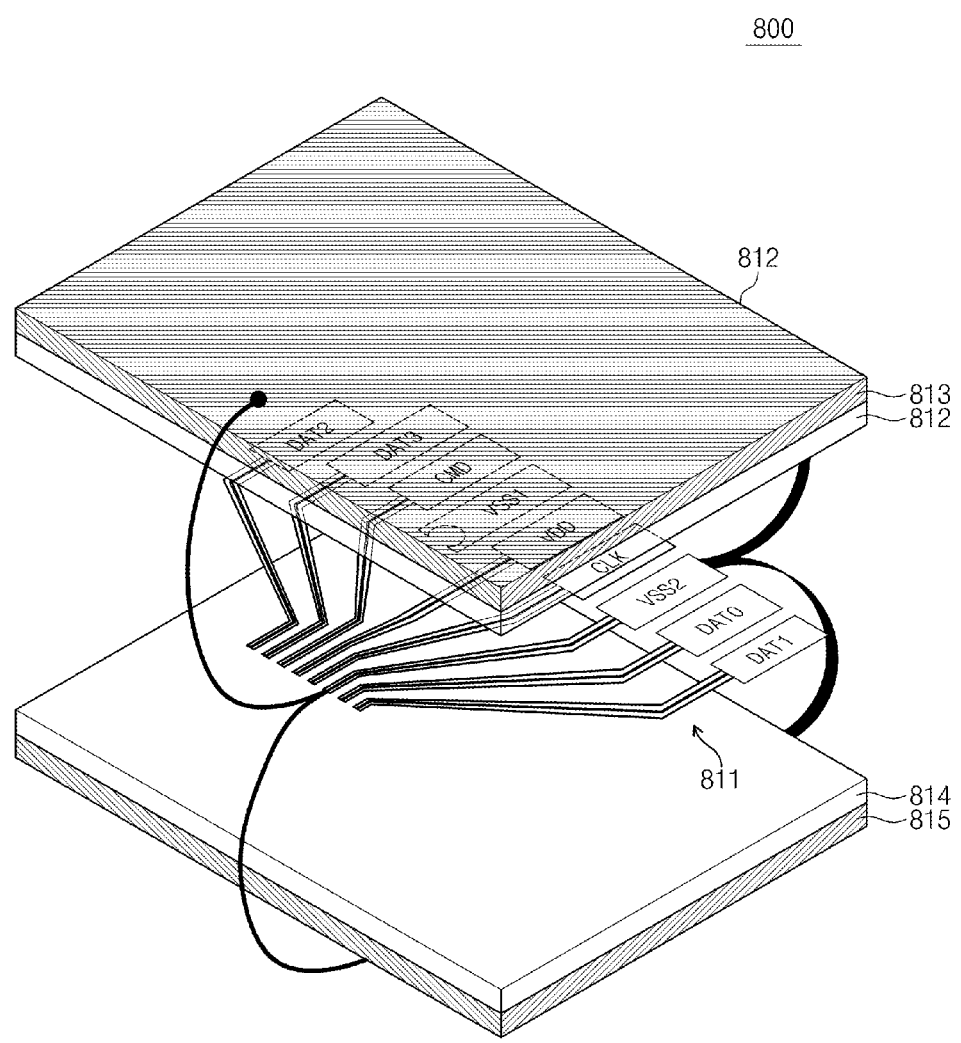
FIG. 10 is a diagram schematically illustrating a memory card adaptor having a pin-to-pin structure according to still another embodiment of the inventive concepts.

FIG. 10 is a diagram schematically illustrating a memory card adaptor having a pin-to-pin structure according to an example embodiment of the inventive concepts. Referring to FIG. 10, a memory card adaptor 800 may include pin-to-pin structured pins 811, a first insulation plate 812 disposed on the pins 811, a first conduction plate 813 disposed on the first insulation plate 812, a second insulation plate 814 disposed under the pins 811, and a second conduction plate 815 disposed under the second insulation plate 814.

According to example embodiments, the conduction plates 813 and 815 may be directly connected with a ground pin VSS2. According to other example embodiments, the conduction plates 813 and 815 may be connected with a pin corresponding to a ground pin VSS2 in the pin-to-pin structure.

FIGS. 1 to 10 illustrate example embodiments in which a conduction area used as a return path has a substrate shape. However, the inventive concepts is not limited thereto. A memory card adaptor according to an example embodiment of the inventive concepts may be implemented by any shape of structure having a conduction area acting as a return path of a signal line.

While the inventive concepts have been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A memory card adaptor, comprising:
   a housing including a bottom lid and a top lid where the top lid together with the bottom lid form the housing, the housing configured to receive a memory card; and
   a package substrate between the bottom lid and the top lid, the package substrate being fixed to the bottom lid, the package substrate including,
      a core having a first surface and a second surface,
      a first layer on the first surface, the first layer including a plurality of contact lands,
      a second layer on the second surface, the second layer including a plurality of contact pads electrically connected with the plurality of contact lands through a plurality of via holes, the plurality of via holes being formed to penetrate the core, and
      one of the first layer and the second layer including a conduction area operating as a return path for at least one signal line, the conduction area defining at least one channel through which a wire is disposed, the wire electrically connecting one of the contact lands or contact pads with one of the via holes,
   wherein the package substrate is a printed circuit board.

2. The memory card adaptor of claim 1, further comprising:
   contact pins formed at a groove of the package substrate, the contact pins electrically connecting the memory card and the plurality of contact lands.

3. The memory card adaptor of claim 1, further comprising:
   contact pins projected from the package substrate, the contact pins electrically connecting the memory card and the plurality of contact lands.

4. The memory card adaptor of claim 1, wherein the plurality of contact pads are electrically connected with the plurality of via holes without wirings.

5. The memory card adaptor of claim 1, wherein,
   the first layer includes a first set of wirings between the plurality of contact lands and the plurality of via holes, each wire of the first set of wirings corresponds to one of the plurality of contact lands, and
   the second layer includes a second set of wirings between the plurality of via holes and the plurality of contact pads, each wire of the second set of wirings corresponds to one of the plurality of contact pads.

6. The memory card adaptor of claim 5, wherein at least one of the first set of wirings or at least one of the second set of wirings is formed in a straight line.

7. The memory card adaptor of claim 1, wherein the second layer includes the conduction area and the conduction area has a planar shape.

8. The memory card adaptor of claim 7, wherein the conduction area is connected with a power pad, the power pad being one of the plurality of contact pads.

9. The memory card adaptor of claim 7, wherein the conduction area is connected with a ground pad, the ground pad being one of the plurality of contact pads.

10. The memory card adaptor of claim 7, wherein,
    the first layer includes a corresponding conduction area having a planar shape, the conduction area corresponding to the first layer operates as the return path, and
    the conduction area corresponding to the second layer and the conduction area corresponding to the first layer are electrically connected through the plurality of via holes.

11. The memory card adaptor of claim 1, wherein at least two of the plurality of via holes are electrically connected to at least one signal pad, the signal pad being one of the plurality of contact pads, and the at least two via holes are electrically connected to the signal pad.

12. The memory card adaptor of claim 11, further comprising:
    a first set of wirings on the first surface that are connected with one of the plurality of contact lands;
    a second set of wirings on the second surface that are connected with the power pad; and
    the plurality of via holes connecting the first set of wirings and the second set of wirings.

13. The memory card adaptor of claim 1, further comprising:
    at least one passive element on the second layer that is connected with the at least one signal line.

14. A memory card adaptor, comprising:
    a housing;
    a plurality of pin-to-pin structured pins including a ground pin;
    an insulation plate on the plurality of pin-to-pin structured pins; and
    a conduction plate, wherein the conduction plate and the insulation plate have a similar shape as the housing.

15. The memory card adapter of claim 14, wherein the plurality of pin-to-pin structured pins includes a power pin, and the conduction plate is connected to the power pin.

16. The memory card adapter of claim 14, wherein the conduction plate is connected to one of (i) the ground pin and (ii) another of the plurality of pin-to-pin structured pins corresponding to the ground pin.

17. A memory card adaptor, comprising:
    a plurality of pin-to-pin structured pins including a ground pin;
    a first insulation plate on the plurality of pin-to-pin structured pins;
    a first conduction plate on the first insulation plate that is connected with the ground pin, the first conduction plate operating as a return path for at least one signal line;
    a second insulation plate under the plurality of pin-to-pin structured pins; and
    a second conduction plate under the second insulation plate that is connected with the ground pin, the second conduction plate operating as a return path for at least one other signal line,
    wherein the first conduction plate and the first insulation plate have a first similar shape, and
    wherein the second conduction plate and the second insulation plate have a second similar shape.

18. A memory card adaptor, comprising:
a housing including a bottom lid and a top lid where the top lid together with the bottom lid form the housing, the housing configured to receive a memory card; and
a package substrate between the bottom lid and the top lid, the package substrate being fixed to the bottom lid, the package substrate including,
a core having a first surface and a second surface,
a first layer on the first surface, the first layer including a plurality of contact lands,
a second layer on the second surface, the second layer including a plurality of contact pads electrically connected with the plurality of contact lands through a plurality of via holes, the plurality of via holes being formed to penetrate the core, and
one of the first layer and the second layer including a conduction area operating as a return path for at least one signal line,
the conduction area not being a wire, is distinct from the contact lands and the contact pads, and covers a majority of the one of the first layer and the second layer,
wherein the package substrate is a printed circuit board.

* * * * *